United States Patent
Kumar et al.

(10) Patent No.: US 12,326,834 B1
(45) Date of Patent: Jun. 10, 2025

(54) INCREMENTALLY DETERMINING CHECKSUMS FOR A SNAPSHOT

(71) Applicant: Cohesity, Inc., San Jose, CA (US)

(72) Inventors: Anirudh Kumar, San Jose, CA (US);
Namit Sharma, San Jose, CA (US);
Avinash Nath Aita, San Jose, CA (US);
Samanvitha Reddy Panyam, Sunnyvale, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/428,615

(22) Filed: Jan. 31, 2024

(51) Int. Cl.
  *G06F 16/11* (2019.01)
  *G06F 16/185* (2019.01)

(52) U.S. Cl.
  CPC .......... *G06F 16/128* (2019.01); *G06F 16/185* (2019.01)

(58) Field of Classification Search
  None
  See application file for complete search history.

(56) References Cited

U.S. PATENT DOCUMENTS

| | | | | |
|---|---|---|---|---|
| 9,830,345 B1* | 11/2017 | Baars | ................. | G06F 16/2246 |
| 10,754,731 B1* | 8/2020 | Arumugam | ......... | G06F 11/1461 |
| 11,074,135 B2 | 7/2021 | Aron et al. | | |
| 2018/0198765 A1 | 7/2018 | Maybee et al. | | |
| 2020/0233840 A1* | 7/2020 | Chakankar | ............ | G06F 3/0647 |
| 2022/0138163 A1* | 5/2022 | Manjunath | ............ | G06F 16/128 707/646 |
| 2023/0195578 A1 | 6/2023 | Lee | | |
| 2023/0334009 A1* | 10/2023 | Feng | .................... | G06F 16/113 |

OTHER PUBLICATIONS

Extended Search Report from counterpart European Application No. 24179035.1 dated Nov. 26, 2024, 11 pp.

* cited by examiner

*Primary Examiner* — Eddy Cheung
(74) *Attorney, Agent, or Firm* — Shumaker & Sieffert, P.A.

(57) ABSTRACT

Techniques are described for incrementally determining checksums for a snapshot. An example method comprises identifying, by a data platform implemented by a computing system, a plurality of leaf nodes and a plurality of intermediate nodes in tree data corresponding to a snapshot of a storage system at a particular time, wherein the intermediate nodes each comprise one or more pointers identifying one or more of the leaf nodes, and the leaf nodes each include an indication of file system data of the storage system. The method includes determining, by the data platform, a checksum for each of the leaf nodes, determining, by the data platform, a checksum for each intermediate node based on the checksum of the one or more leaf nodes identified by the pointers of the intermediate node; and storing, by the data platform, the checksum for each of the leaf nodes and each of the intermediate nodes.

20 Claims, 11 Drawing Sheets

INCREMENTALLY DETERMINING CHECKSUMS FOR A SNAPSHOT

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

A file system snapshot is a point-in-time copy or representation of the entire file system or a specific subset of it. A snapshot captures the state of files and directories at a particular moment, providing a snapshot of the file system's data as it existed at that specific point. File system snapshots are often used for backup and recovery purposes and can offer benefits in terms of data protection and system consistency. The file system data can include file system's objects (e.g., files, directories), metadata, or both.

SUMMARY

Aspects of this disclosure describe techniques for incrementally generating checksums for a snapshot of file system data. File system data, such as objects, may be divided into smaller portions or chunks. For example, a plurality of individual chunks in one or more chunkfiles may together contain the data of an object of the file system. To assist with snapshot verification, some data platforms may store a checksum for each chunk, which may be used to validate the chunk by comparing a checksum for the chunk to a previously stored checksum for the chunk. However, a data platform utilizing checksums in this manner may not be capable of determining whether a snapshot is consistent in some cases (e.g., whether the snapshot completely and accurately represents the complete state of the file system). For example, the checksums do not indicate whether the chunks are in the correct order or out of order. As such, even if the data platform validates each chunk in a set of chunks with a checksum, the data stored in the snapshot including the set of chunks may be inconsistent.

The techniques described herein incrementally generate checksums for a snapshot, rather than generating a checksum for the entire snapshot. For example, a data platform may leverage the data structure used to implement the snapshot to generate an aggregate checksum for checksums of multiple chunks directly or indirectly referenced by a node in the data structure. This aggregate checksum may be stored in association with the node, and the aggregate checksum may be computed as a function of the respective checksums of the multiple chunks. When a subsequent snapshot is generated from file system data, resulting in modification of one or more of these multiple chunks, the aggregate checksum is recomputed based on the modified chunks. In this way, the modified aggregate checksum represents an incrementally generated checksum for this portion of the snapshot (e.g., the chunks directly or indirectly referenced by the node) and is an incremental change to the overall checksum data for the snapshot. For portions of the snapshot with nodes that reference chunks that have not been modified from the previous snapshot of file system data, the data platform can avoid recomputing checksums and aggregate checksums based on the unmodified chunks. A data platform may store the incrementally generated checksums, including the aggregate checksums, and use the checksums to validate the snapshot.

The techniques of this disclosure may provide one or more technical advantages that realize one or more practical applications. As noted above, incrementally generating aggregate checksums for portions of the chunks allows the data platform to avoid recomputing checksums based on unmodified chunk data and recomputing checksums for entire snapshots. The techniques may therefore have reduced system requirements (e.g., memory, memory bandwidth, and computing resources) and cost as compared to a data platform that generates a checksum over the entire snapshot, for each snapshot. The techniques may also reduce the time taken to complete a snapshot checksum process and, in this way, improve system responsiveness. For example, the techniques may increase the data platform's capacity to perform other tasks, including storage and retrieval of data, as compared to a data platform that generates a checksum for the entire snapshot.

Although the techniques described in this disclosure are primarily described with respect to a backup function of a data platform (e.g., validating backups in the form of snapshots), similar techniques may be applied for an archive function (e.g., validating archives) or other similar function of the data platform. In some examples, the techniques described herein may be used to validate file system data in a live file system, in addition to validating backups or archives.

In one example, this disclosure describes a method comprising identifying, by a data platform implemented by a computing system, a plurality of leaf nodes and a plurality of intermediate nodes in tree data corresponding to a snapshot of a storage system, wherein the plurality of intermediate nodes each comprise one or more pointers identifying one or more of the plurality of leaf nodes, and the plurality of leaf nodes each include an indication of file system data of the storage system. The method includes determining, by the data platform, a checksum for each of the plurality of leaf nodes; determining, by the data platform, a checksum for each intermediate node of the plurality of intermediate nodes based on the respective checksums of the one or more of the plurality of leaf nodes identified by the one or more pointers of the intermediate node; and storing, by the data platform, the checksum for each of the plurality of leaf nodes and the checksum for each of the plurality of intermediate nodes.

In another example, this disclosure describes a computing system comprising a memory storing instructions, and processing circuitry that executes the instructions to: identify a plurality of leaf nodes and a plurality of intermediate nodes in tree data corresponding to a snapshot of a storage system, wherein the plurality of intermediate nodes each comprise one or more pointers identifying one or more of the plurality of leaf nodes, and the plurality of leaf nodes each include an indication of file system data of the storage system. The processing circuitry further executes the instructions to: determine a checksum for each of the plurality of leaf nodes; determine a checksum for each intermediate node of the plurality of intermediate nodes based on the respective checksums of the one or more of the plurality of leaf nodes identified by the one or more pointers of the intermediate node; and store, by the data platform, the checksum for each of the plurality of leaf nodes and the checksum for each of the plurality of intermediate nodes.

In another example, this disclosure describes a computer-readable storage medium comprising instructions that, when executed, cause processing circuitry of a computing system to: identify a plurality of leaf nodes and a plurality of intermediate nodes in tree data corresponding to a snapshot of a storage system, wherein the plurality of intermediate nodes each comprise one or more pointers identifying one or more of the plurality of leaf nodes, and the plurality of leaf nodes each include an indication of file system data of the storage system. When further executed, the instructions cause the processing circuitry to: determine a checksum for each of the plurality of leaf nodes; determine a checksum for each intermediate node of the plurality of intermediate nodes based on the respective checksums of the one or more of the plurality of leaf nodes identified by the one or more pointers of the intermediate node; and store, by the data platform, the checksum for each of the plurality of leaf nodes and the checksum for each of the plurality of intermediate nodes.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
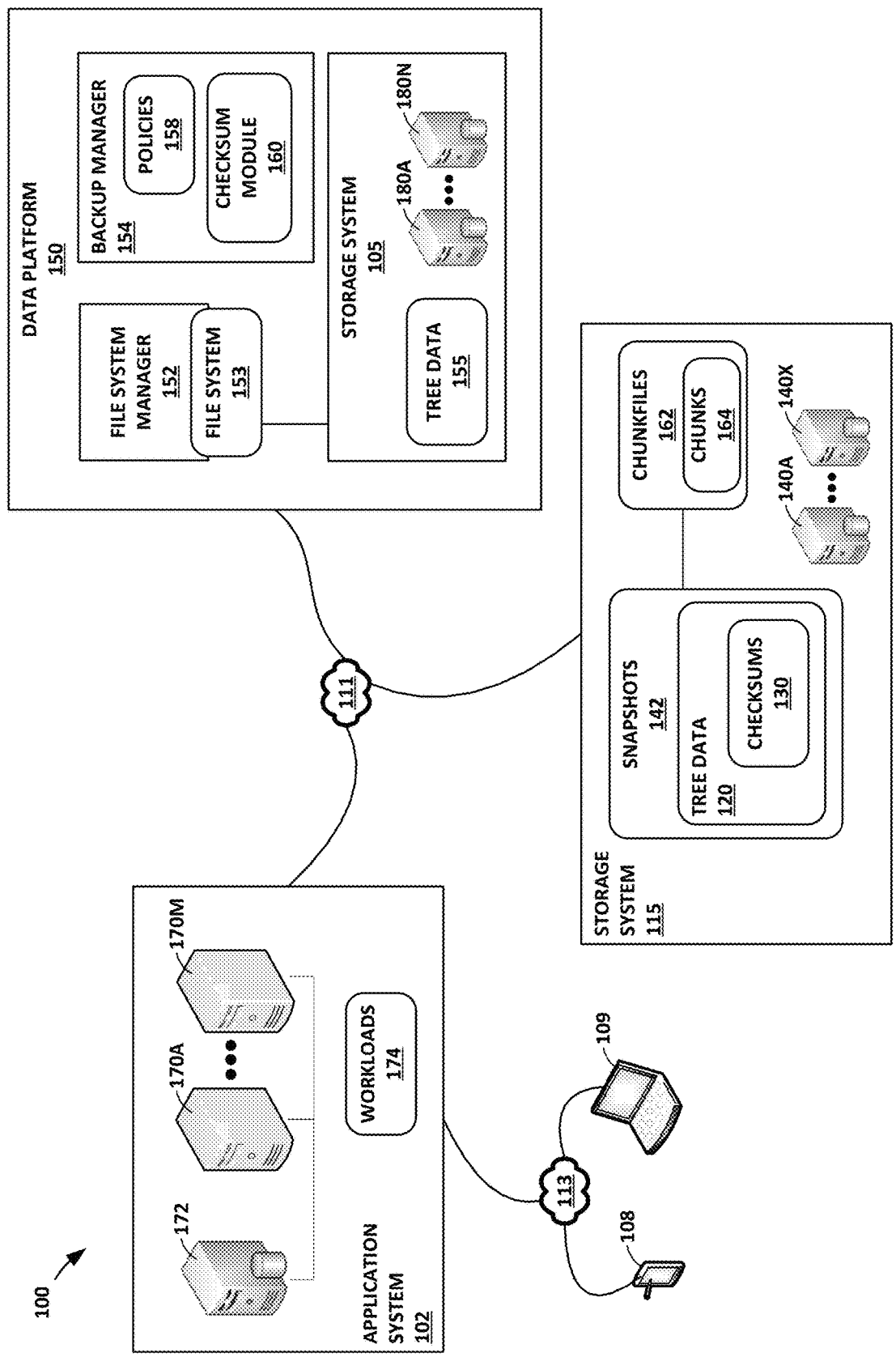
FIGS. 1A-1B are block diagrams illustrating example systems that incrementally determine checksums for a snapshot, in accordance with one or more aspects of the present disclosure.
Figure 1B:
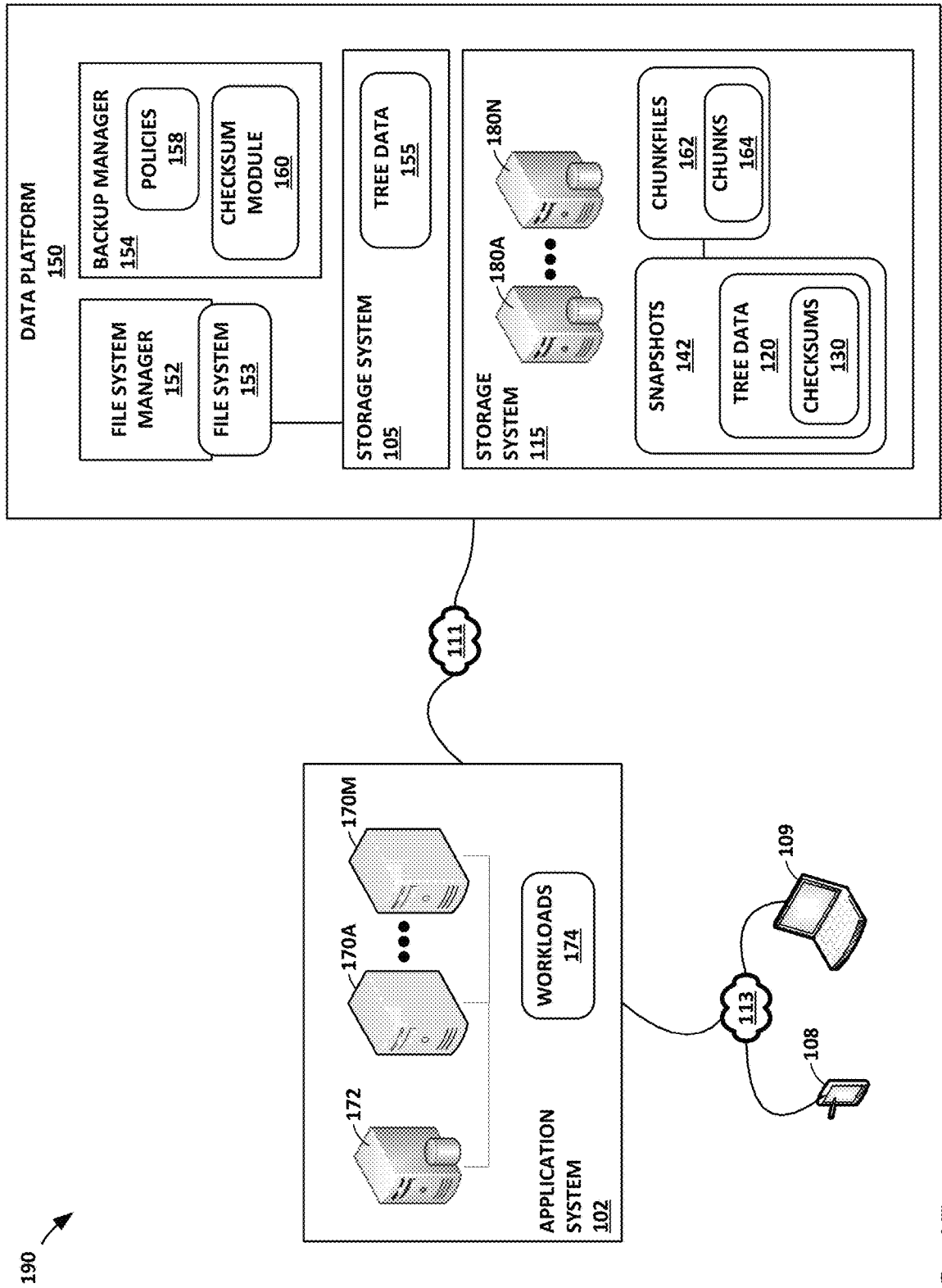

FIGS. 1A-1B are block diagrams illustrating example systems that incrementally determine checksums for a snapshot, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and backup manager 154 in the example of system 100. In some examples, separate compute devices (not shown) execute software for data platform 150, such as file system manager 152 and backup manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Snapshots 142 or archives created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. As shown in the example of FIG. 1A for instance, storage system 105 may store metadata for file system 153 in a tree data structure, such as tree data 155. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes backup manager 154 that provides backups of file system data for file system 153. In the example of system 100, backup manager 154 stores one or more backups or snapshots 142 of file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup and archive. In general, a file system backup or snapshot 142 is a copy of file system 153 to support protecting file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Backup manager 154 may backup file system data for file system 153 at any time in accordance with backup policies that specify, for example, backup periodicity and timing (daily, weekly, etc.), which file system data is to be backed up, a backup retention period, storage location, access control, and so forth. An initial backup of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups of the file system 153 may correspond to respective states of the file system 153 at respective subsequent backup creation times, i.e., after the backup creation time corresponding to the initial backup. A subsequent backup may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored in a backup at storage system 115. File system data that is included in a subsequent backup may be deduplicated by backup manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, backup manager 154 stores backups of file system data to storage system 115 as snapshots 142, using chunkfiles 162. Backup manager 154 may use any of snapshots 142 to subsequently restore the file system (or portion thereof) to its state at the snapshot creation time, or the snapshot may be used to create or present a new file system (or "view") based on the snapshot, for instance. As noted above, backup manager 154 may deduplicate file system data included in a subsequent snapshot against file system data that is included in one or more previous snapshots. For example, a second object of file system 153 included in a second snapshot may be deduplicated against a first object of file system 153 and included in a first, earlier snapshot. Backup manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Backup manager 154 may apply deduplication as part of a write process of writing (i.e., storing) an object of file system 153 to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, backup manager 154 can compute chunks having chunk sizes within the range of 16-48 kB. Backup manager 154 may eschew deduplication for objects that that are less than 16 kB. In some example implementations, when data of an object is being considered for deduplication, backup manager 154 compares a chunk identifier (ID) (e.g., a hash value of the entire chunk) of the data to existing chunk IDs for already stored chunks. If a match is found, backup manager 154 updates metadata for the object to point to the matching, already stored chunk. If no matching chunk is found, backup manager 154 writes the data of the object to storage as one of chunks 164 for one of chunkfiles 162. Backup manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of snapshots 142, and is described in further detail below.

Each of chunkfiles 162 includes multiple chunks 164. Chunkfiles 162 may be fixed size (e.g., 8 MB) or variable size. Chunkfiles 162 may be stored co-located with snapshot metadata, such as tree data 120. In some cases, chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system.

The process of deduplication for multiple objects over multiple snapshots results in chunkfiles 162 that each have multiple chunks 164 for multiple different objects associated with the multiple snapshots. In some examples, different snapshots 142 may have objects that are effectively copies of the same data, e.g., for an object of the file system that has not been modified. An object of a snapshot may be represented or "stored" as metadata having references to chunks that enable the object to be accessed. Accordingly, description herein to a snapshot 142 "storing," "having," or "including" an object includes instances in which the snapshot does not store the data for the object in its native form.

A user or application associated with application system 102 may have access (e.g., read or write) to data that is stored in storage system 115. The user or application may delete some of the data due to a malicious attack (e.g., virus, ransomware, etc.), a rogue or malicious administrator, and/or human error. The user's credentials may be compromised and as a result, the data that is stored in storage system 115 may be subject to ransomware. To reduce the likelihood of accidental or malicious data deletion or corruption, a data lock having a data lock period may be applied to a snapshot.

As described above, chunkfiles 162 may represent an object in a snapshot storage system (shown as "storage system 115," which may also be referred to as "snapshot storage system 115") that conform to an underlying architecture of snapshot storage system 115. Data platform 150 includes backup manager 154 that supports archiving of data in the form of chunkfiles 162, which interface with snapshot storage system 115 to store chunkfiles 162 after forming chunkfiles 162 from one or more chunks 164 of data. Backup manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

Backup manager 154 may organize and store file system data (e.g., one or more objects or metadata) as tree data 120. In some examples, backup manager 154 may store tree data 120 on storage system 115. Tree data 120 may comprise one or more tree data structures including nodes linked by pointers. For example, backup manager 154 may store tree data 120 comprising a tree data structure storing file system data (e.g., objects or metadata) of a file system at one or more nodes of the tree data structure. Backup manager 154 may traverse the tree data 120 to locate file system data (e.g., objects or metadata of the file system). In some examples, backup manager 154 may organize tree data 120 into one or more separate tree data structures. For example, backup manager 154 may store tree data 120 comprising a tree data structure for metadata and a separate tree data structure for objects. In some examples, backup manager 154 may store tree data 120 comprising a tree data structure within another tree data structure (e.g., nested tree data structure or a subtree).

A tree data structure includes a plurality of nodes where individual nodes reference one or more other nodes, such as through one or more pointers to the other nodes. The tree structure may comprise a hierarchy of nodes. For example, a tree data structure may include a root node, one or more intermediary nodes, and one or more leaf nodes, or various subsets thereof. As described above, a tree data structure may include nested tree structures (e.g., subtrees), which each may comprise a root node, one or more levels of intermediary nodes, and one or more leaf nodes, or various subsets thereof.

In some examples, backup manager 154 may utilize a tree structure based on a B+ tree data structure. For instance, backup manager 154 may store and retrieve file system data from a tree data structure comprising a root node and intermediary nodes that form an index for locating file system data. In this example, backup manager 154 may store file system data (e.g., an object or metadata) at leaf nodes. In some examples, backup manager 154 may store one or more references (e.g., pointers) to file system data at a leaf node rather than storing the file system data in the leaf node. For instance, backup manager 154 may store one or more references (e.g., pointers) to one or more chunks 164 of an object (which may be stored at storage system 115) at a leaf node rather than storing the object or one or more chunks 164 thereof at the leaf node.

Snapshot 142 may comprise tree data 120 (e.g., tree data 120 may be used to store one or more snapshots 142). Each snapshot 142 may record or store the state of a file system at different times. For example, backup manager 154 may store tree data 120 comprising a first snapshot 142 of the state of an entire file system at a first time and a second snapshot 142 including incremental changes to the file system since the first snapshot. In some examples, backup manager 154 may store tree data 120 including one or more snapshots 142 of the state of an entire file system and one or more snapshots 142 including incremental changes to the file system since an earlier snapshot.

Backup manager 154 may traverse tree data 120 of a snapshot to retrieve a copy (e.g., backup) of the file system (e.g., the file system data of the file system) at a particular time, such as a time requested by a user. For example, backup manager 154 may locate a snapshot having a timestamp matching the time requested by the user (or other time) and traverse tree data 120 starting from a root node thereof to retrieve data for the snapshot. Backup manager 154 may retrieve one or more incremental or entire snapshots of a file system while traversing tree data 120. Backup manager 154 may apply incremental snapshots to an earlier incremental or full snapshot to generate or output a copy of the file system for the particular time. Additional examples and techniques for storage and retrieval of file system data in a tree structure are described in "MAINTAINING AND UPDATING A BACKUP VIEW OF AN APPLICATION AND ITS ASSOCIATED OBJECTS," U.S. patent application Ser. No. 17/960,515, filed Oct. 5, 2022, the entire contents of which are hereby incorporated by reference.

In accordance with the techniques of this disclosure, backup manager 154 includes checksum module 160 to generate checksums 130 for one or more nodes in tree data 120. Checksum module 160 may implement one or more functions that receive an input and compute a checksum 130 representative of the input in a relatively small amount of data (e.g., 64 or 128 characters). For example, checksum module 160 may implement various processes for generating checksums with associative properties such that a change in the order or sequence of input data results in distinct checksums. Some example processes for generating checksums include hash functions, such as secure hash algorithms (e.g., SHA-1 or SHA-2), bitwise AND, and combining n significant bits of input data.

Checksum module 160 may incrementally generate checksums 130 for a snapshot by generating individual checksums 130 at each node within tree data 120 of the snapshot. In operation, checksum module 160 may utilize checksums 130 from one or more child nodes, if any, as input to generate a checksum 130 for a parent node. Such a checksum is referred to herein as an "aggregate checksum." For example, checksum module 160 may convert each checksum 130 from one or more child nodes into a matrix (e.g., convert a 256 bit checksum into a 16×16 matrix). Checksum module 160 may matrix multiply each matrix in order (e.g., left to right) to generate an aggregate checksum for the parent node. Some nodes, such as leaf nodes, may have no child nodes. In such case, checksum module 160 may generate a checksum 130 for a leaf node with data in or associated with the leaf node. For example, checksum module 160 may generate a checksum 130 with file system data (e.g., an object or metadata) or other data (e.g., pointers) of a leaf node as input.

In some examples, backup manager 154 may incrementally generate checksums by generating checksums for only the portion of file system data that has changed relative to a preceding snapshot. For example, a first snapshot may have a checksum, such as may be generated by checksum module 160, at each node of the first snapshot's tree data 120. Backup manager 154 may create a second snapshot having tree data 120 including pointers to new nodes representing changes since the first snapshot and pointers to nodes in the first snapshot representing file system data that has not changed since the first snapshot. Checksum module 160 may incrementally generate checksums for the second snapshot by generating checksums for the new nodes in the second snapshot. In this manner, checksum module 160 avoids generating checksums for nodes representing file system data that is unchanged and avoids generating checksums across the entire snapshot.

Backup manager 154 may create new nodes by cloning nodes from an earlier snapshot. For example, to include a new leaf node, backup manager 154 may clone a subtree from the first snapshot including a leaf node with now outdated file system data. The cloned subtree may comprise the parent and ancestor nodes of the leaf node with outdated file system data. Backup manager 154 may modify one or more pointers in the cloned subtree to point to the new leaf node rather than the leaf node with outdated file system data. In this manner, the snapshot comprising the cloned subtree (e.g., the second snapshot) includes the changed file system data.

Checksum module 160 may omit or clear the checksums for each node in the cloned subtree to allow checksum module 160 to identify nodes requiring checksums. Checksum module 160 may generate checksums at each node with an empty or cleared checksum to incrementally generate checksums for the snapshot comprising the cloned subtree, which is the portion of the nodes in the snapshot representing the changed file system data. In some examples, rather than clearing or omitting checksums, checksum manager 160 may include a flag or other data in cloned nodes to identify these nodes as requiring checksums.

In contrast, rather than incrementally generating checksums, some data platforms may generate a checksum for an entire snapshot. In the case of large snapshots (e.g., 5 gigabytes (GBs) or more), generating a checksum for the entire snapshot is computationally intensive since the entire snapshot may need to be processed to generate the checksum. Snapshots in an enterprise environment can frequently amount to hundreds of GBs, terabytes (TBs), or more, and data platforms generating checksums for these snapshots would consume substantial computing resources and, in some cases, for long periods of time (e.g., hours). To validate a checksum for an entire snapshot, the data platform generates yet another checksum over the entire snapshot, thereby again requiring similar computing resources and time to generate the checksum for validation purposes.

To incrementally generate checksums with respect to tree data 120, checksum module 160 may, in some examples, generate a checksum 130 for a root node with a checksum 130 of each intermediate node that is a child node of the root node as input. Similarly, checksum module 160 may generate a checksum 130 for an intermediate node with a checksum 130 of each of the intermediate node's child node(s) (e.g., leaf nodes or other intermediate nodes). In some examples, checksum module 160 may compute an aggregate checksum for a parent node as a function of individual checksums 130 of child nodes, such as by concatenating the checksums 130 of the child nodes, and using the combined checksums 130 as input to generate an aggregate checksum 130 for the parent node. As other examples, checksum module 160 may compute an aggregate checksum for a parent node based on respective checksums 130 of the child nodes of that parent node as a bitwise AND or XOR (or otherwise bitwise operator), as a combination of n significant bits, as a checksum of the checksums 130, or as another function of the checksums 130 for the child nodes.

In some examples, when incrementally generating checksums for a snapshot, checksum module 160 may traverse tree data 120 of the snapshot, using the pointers between nodes of tree data 120 and generate checksums 130 at each node. To traverse tree data 120, checksum module 160 may use the pointers between nodes to locate individual nodes within tree data 120. Checksum module 160 may, in some examples, implement a depth first traversal process whereby each child node is traversed before traversing or returning to a parent node, such as a post-order traversal process. In some examples, checksum module 160 may perform a post-order traversal to traverse tree data 120 for a snapshot in a sequence beginning with lower level nodes (e.g., child nodes) followed by higher level nodes (e.g., parent nodes). Checksum module 160 may repeat a post-order traversal process for each subtree within tree data 120 beginning at a leaf node in the tree data 120 and progressing to end ultimately at a root node of tree data 120. By traversing a tree structure from lower levels to higher levels (e.g., a post-order traversal), checksums 130 from lower level nodes (e.g., child nodes) may be used to generate checksums 130 at respective higher level nodes (e.g., parent nodes).

During traversal, checksum modules 160 may determine whether a node includes or does not include pointers, such as to determine whether the node is a leaf node (e.g., a node without child nodes). If checksum module 160 determines a node is a leaf node, checksum module 160 may generate checksum 130 with data in or associated with the node as input. For example, checksum module 160 may generate a checksum for a leaf node with an object (e.g., one or more chunks 164), metadata or other data stored in or referenced by the leaf node. In some examples, node types may be determined with an identifier assigned to the node. For instance, checksum module 160 may determine a node is leaf or other type of node based on an identifier thereof.

In some examples, checksum module 160 may initiate the post-order traversal checksum generation process upon backup manager 154 generating a full or incremental snapshot 142 of file system data. As will be described further below, for incremental snapshots 142, checksum module 160 may generate checksums for nodes representing the incremental snapshot 142 without generating checksums for previous snapshots 142.

To validate a snapshot, backup manager 154 may perform a validation traversal of tree data 120. A validation traversal may be a traversal such as described above (e.g., a post-order traversal). During the validation traversal, backup manager 154 may generate validation checksums for each node and compare the validation checksum to a previously generated checksum 130 for the node. Backup manager 154 may generate validation checksums in the same manner with which checksums 130 are generated. Backup manager 154 may determine the snapshot is invalid upon determining a mismatching validation checksum and checksum for a particular node.

If no mismatching validation checksums are identified, backup manager 154 may determine the snapshot is valid. In some examples, backup manager 154 may determine a snapshot is valid by examining a portion of tree data 120 (e.g., a subtree) rather than the entirety of tree data 120. For instance, backup manager 154 may determine a snapshot is valid if checksum 130 of a root node matches the validation checksum for the root node. To generate the validation checksum for the root node, backup manager 154 may only traverse a subtree of tree data 120 that includes the root node rather than traversing the entirety of tree data 120.

Backup manager 154 may validate checksums in a batch process in some examples, such as in a map reduce process. For example, backup manager 154 may traverse tree data 120 to generate one or more maps storing a checksum, parent node, and one or more child nodes for each node. Backup manager 154 may conduct one or more reduce processes on nodes in the one or more maps to generate validation checksums for each node whereby checksums from child nodes may be retrieved from a map and combined to generate validation checksums for parent nodes. Backup manager 154 may compare a validation checksum for each node to validate a snapshot.

System 190 of FIG. 1B is a variation of system 100 of FIG. 1A in that data platform 150 stores snapshots 142 using chunkfiles 162 stored to snapshot storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by backup manager 154 for initially storing and accumulating chunks prior to storage at storage system 115. Backup manager 154 may store tree data 120 comprising nodes with references (e.g., pointers) to one or more chunks 164 at storage system 115. Though not shown, backup manager 154 may store tree data 120 and checksums 130 at storage system 105 in addition to or instead of storage system 115, regardless of whether or not storage system 115 is remote or local to data platform 150, in some examples.

Figure 2:
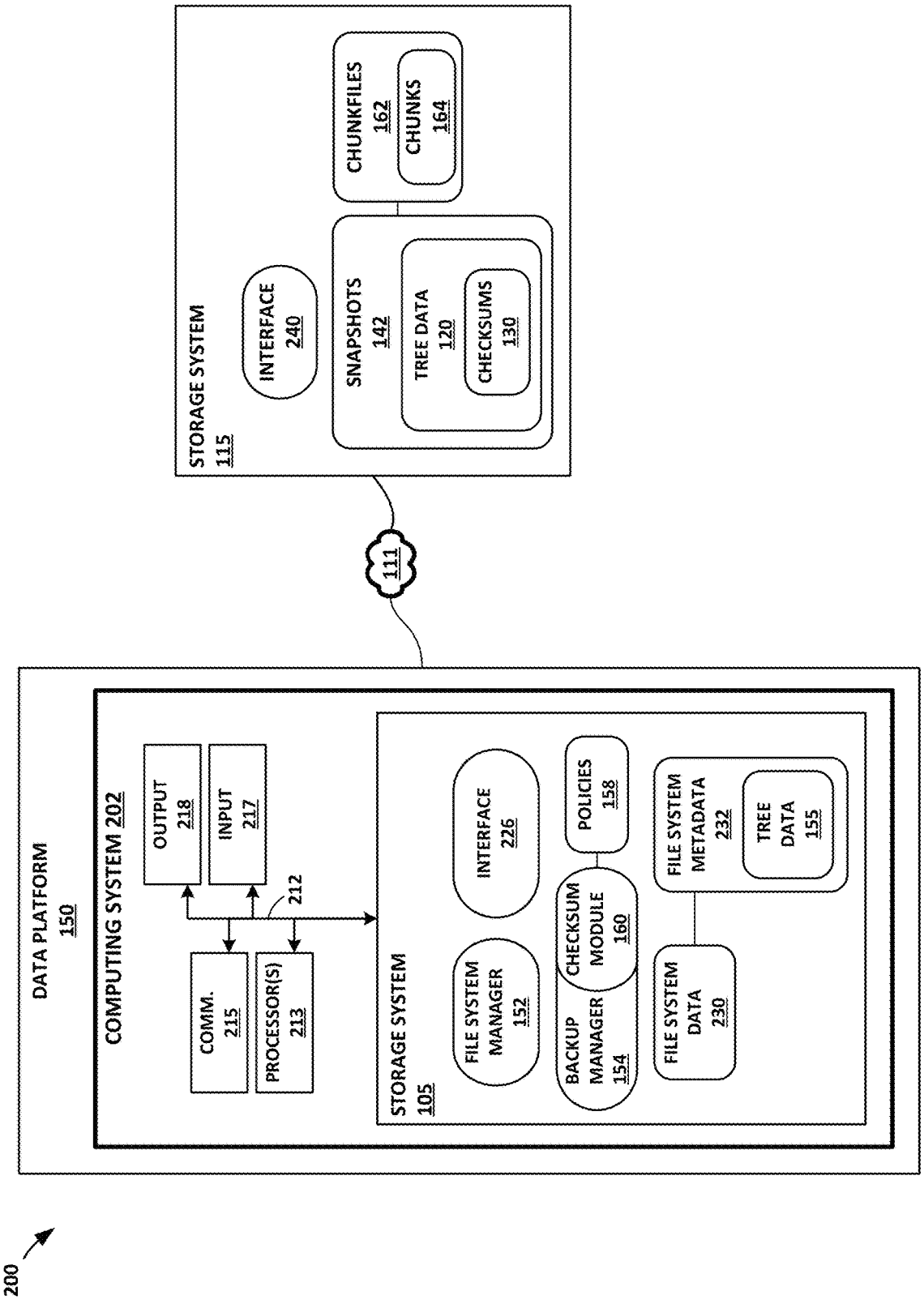
FIG. 2 is a block diagram illustrating an example system that incrementally determines checksums for a snapshot, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where chunkfiles 162 are written to a local snapshot storage system 115). Backup manager 154 may store tree data 120 including one or more nodes with references (e.g., pointers) to chunks 164 at local snapshot storage system 115. One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one snapshot storage system 115 is depicted, data platform 150 may apply techniques in accordance with this disclosure using multiple instances of snapshot storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 may include interface module 226, file system manager 152, and policies 158 as well as backup manager 154 and checksum module 160. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more trees, such as tree data 155, that describe objects within file system 153 and the file system 153 hierarchy, and can be used to write or retrieve objects within file system 153. File system manager 152 may interact with and/or operate in conjunction with one or more modules of computing system 202, including interface module 226 and backup manager 154.

Backup manager 154 may perform functions relating to backing up file system 153, as described above with respect to FIG. 1A, including operations described above with respect to checksum module 160. Backup manager 154 may generate one or more snapshots 142 and cause file system data 230 to be stored as tree data 120 and chunks 164 within chunkfiles 162 in snapshot storage system 115. Backup manager 154 may apply a deduplication process to selectively deduplicate chunks of objects within file system data 230, in accordance with one or more policies 158. Backup manager 154 may generate and manage tree data 120 for generating, viewing, retrieving, or restoring any of snapshots 142. Backup manager 154 may generate and manage tree data 120 for generating, viewing, retrieving, or restoring objects stored as chunks 164 (and references thereto) within chunkfiles 162, for any of snapshots 142. Stored objects may be represented and manipulated using logical files for identifying chunks for the objects.

Local storage system 105 may store a chunk table that describes chunks 164. The chunk table may include respective chunk IDs for chunks 164 and may contain pointers to chunkfiles 162 and offsets within chunkfiles 162 for retrieving chunks 164 from storage system 115. Chunks 164 are written into chunkfiles 162 at different offsets. By comparing new chunk IDs to the chunk table, backup manager 154 can determine if the data already exists on the system. If the chunks already exist, data can be discarded and metadata for an object may be updated to reference the existing chunk. Backup manager 154 may use the chunk table to look up the chunkfile identifier for the chunkfile that contains a chunk.

Local storage system 105 may include a chunkfile table that describes respective physical or virtual locations of chunkfiles 162 on storage system 115, along with other metadata about the chunkfile, such as a checksum, encryption data, compression data, etc. In FIG. 2, backup manager 154 causes tree data 120 to be stored to local storage system 105. In some examples, backup manager 152 causes some or all of tree data 120 to be stored to snapshot storage system 115. Backup manager 152, optionally or in conjunction with file system manager 152, may use tree data 120 and/or file system metadata 232 to restore any of snapshots 142 to a file system implemented by data platform 150, which may be presented by file system manager 152 to other systems.

Interface module 226 may execute an interface by which other systems or devices may determine operations of file system manager 152 or backup manager 154. Another system or device may communicate via an interface of interface module 226 to specify one or more policies 158.

System 200 may be modified to implement an example of system 190 of FIG. 1B. In the modified system 200, chunkfiles 162 are stored to a local snapshot storage system 115 to support snapshots 142.

Interface module 240 of snapshot storage system 115 may execute an interface by which other systems or devices may create, modify, delete, or extend a "write once read many" (WORM) lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 162).

Figure 3A:
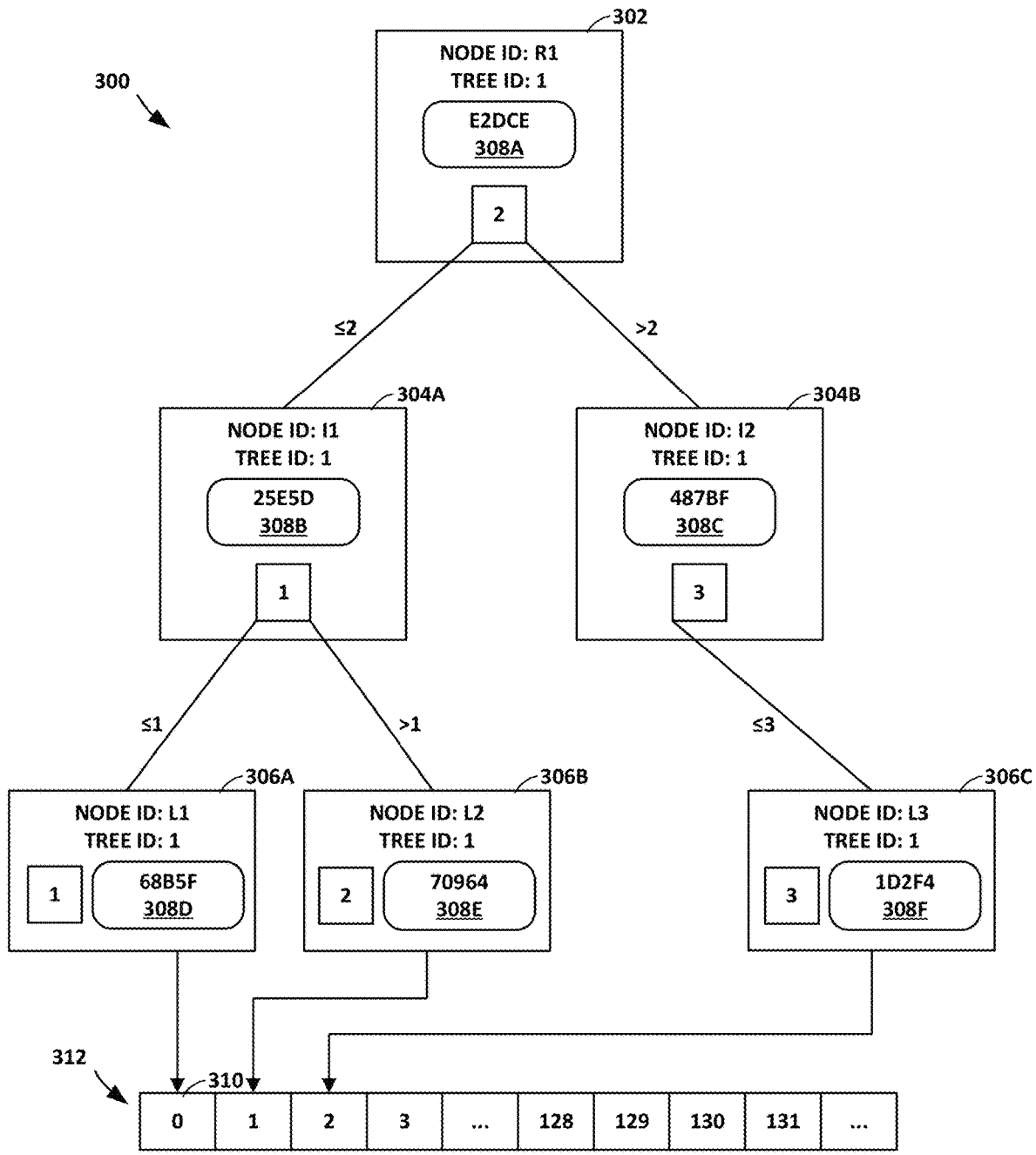
FIGS. 3A-3C are block diagrams illustrating example tree data having respective sets of nodes, in accordance with techniques of this disclosure.
Figure 3B:
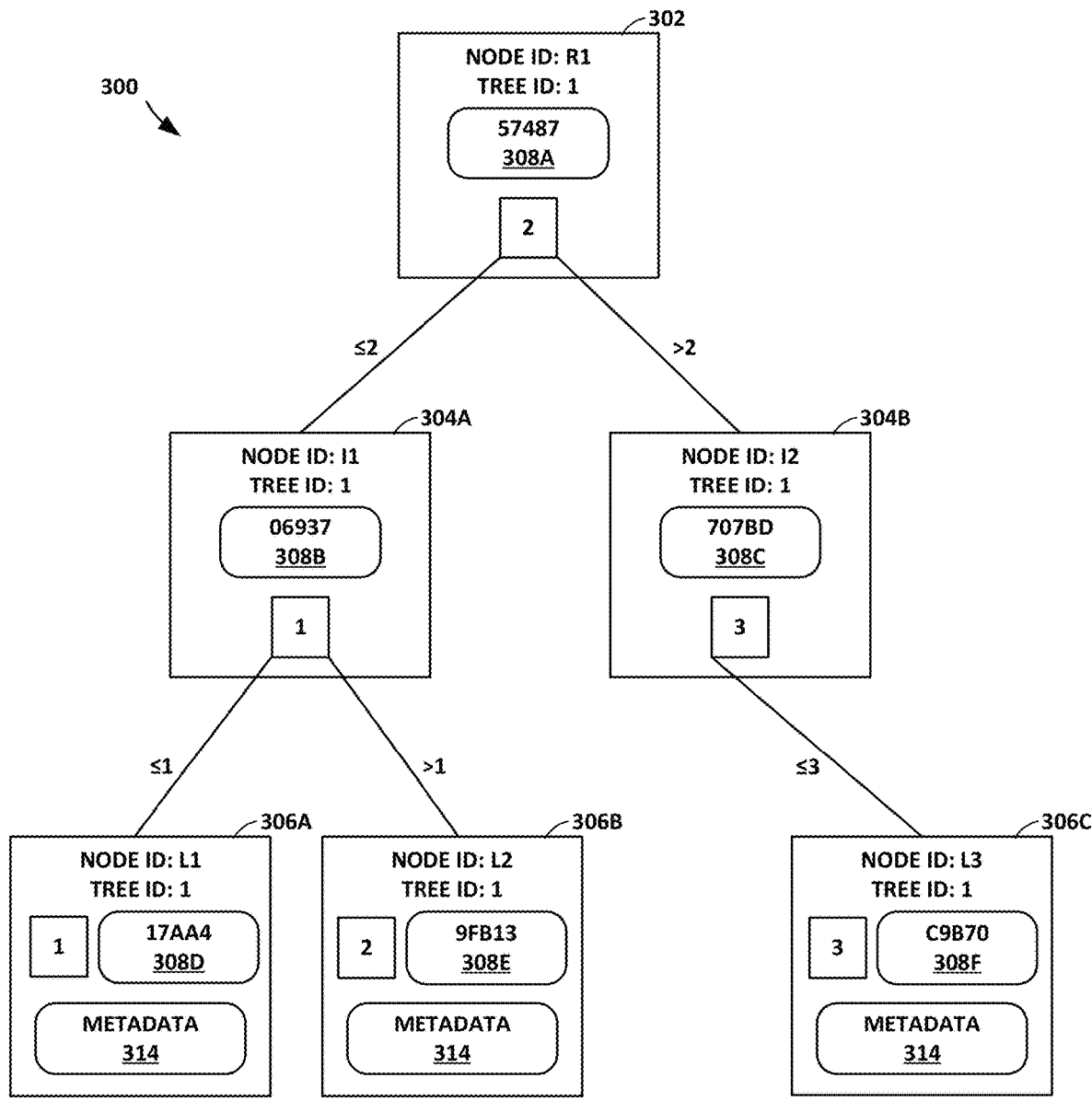
Figure 3C:
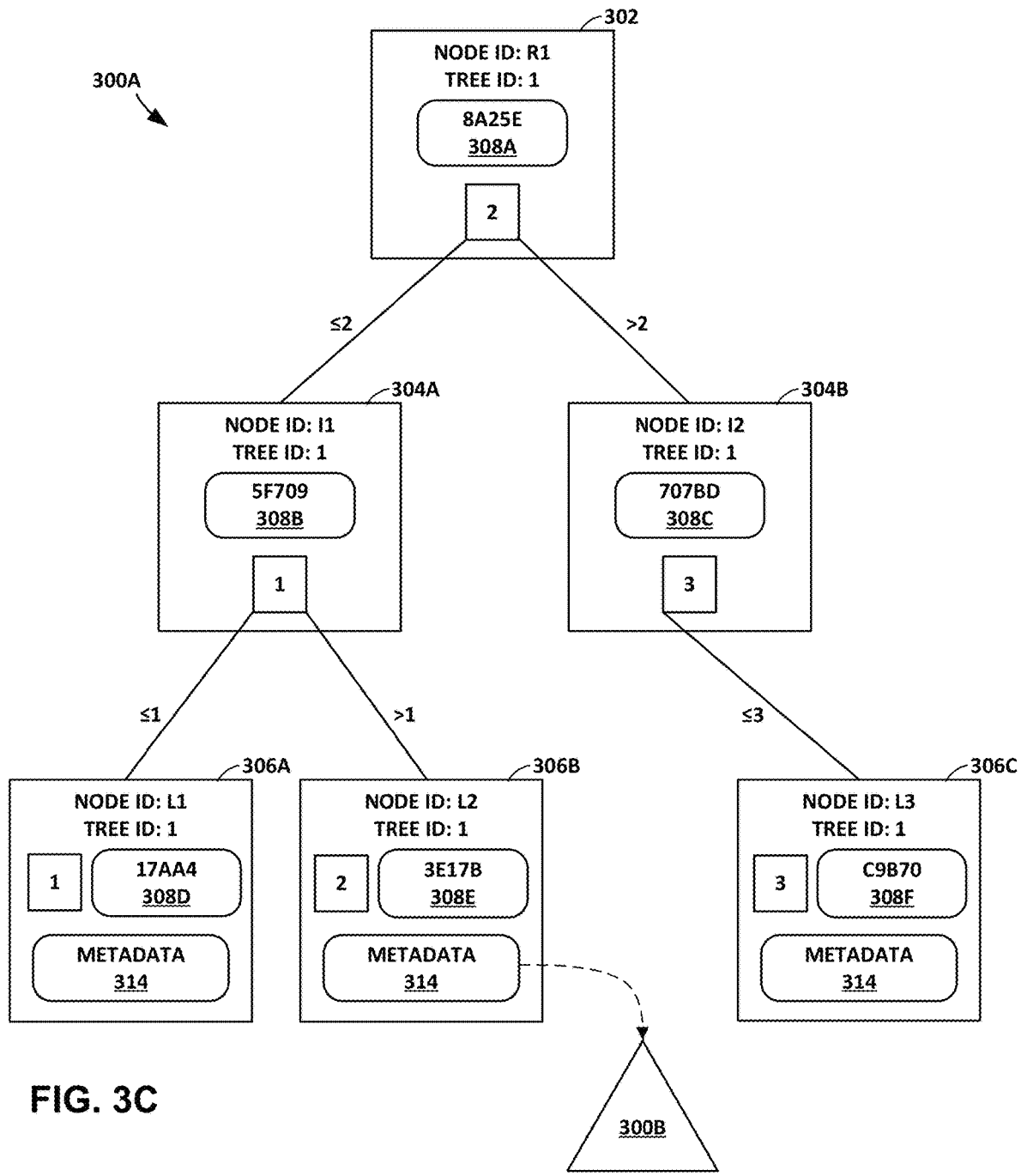

FIGS. 3A-3C are block diagrams illustrating example tree data 300 having respective sets of nodes, in accordance with techniques of this disclosure. Referring to FIG. 3A for example, tree data 300 may be a tree data structure and may comprise one or more root nodes 302, one or more intermediate nodes 304, and one or more leaf nodes 306 interconnected by pointers. Though illustrated as including one level of intermediate nodes 304 between root node 302 and leaf nodes 306, tree data 300 may include additional intermediate levels between root node 302 and leaf nodes 306 (e.g., intermediate nodes 304 with pointers to other intermediate nodes 304).

The example of FIG. 3A illustrates tree data 300 for a snapshot of file system data. Root node 302 includes one or more pointers to one or more other nodes in the snapshot. In some examples, root node 302 may form an entry point for a snapshot in that the snapshot may be retrieved by traversing tree data 300 starting from root node 302. Intermediate nodes 304 may be nodes to which another node points and include pointers to other nodes. Leaf nodes 306 may be a node at the bottom of tree data 300 and may have no pointers to other nodes. Each node 302, 304, 306 may include a checksum 308.

In some examples, each node 302, 304, 306 in tree data 300 may have a node identifier, tree identifier, or both represented respectively by the Node IDs and Tree IDs of FIG. 3A. A node identifier may be a name that uniquely identifies a node 302, 304, 306. A tree identifier may be a string or other identifier that identifies the tree data structure (e.g., snapshot) to which the node belongs.

As described above, in some examples, root node 302 and intermediate nodes 304 may form an index through which file system data at leaf nodes 306 may be located. For instance, root node 302 and intermediate nodes 304 may include one or more node keys that indicate which pointer to traverse to locate a particular leaf node 306 (e.g., a leaf node 306 with a desired object data or metadata). In the example of FIG. 3A, root node 302 has a node key of 2, intermediate node 304A has a node key of 1, and intermediate node 304B has a node key of 3. Each node key may have one or more pointers which may be selected for traversal based on a comparison between the node key and a key value. In FIG. 3A for example, for each node key, a first pointer may be traversed for key values less than or equal to the node key and a second pointer may be traversed for values greater than the node key. Key values may identify a leaf node 306 containing or referencing desired data. For example, leaf node 306A has a key value of 1, leaf node 306B has a key value of 2, and leaf node 306C has a key value of 3.

As such, to locate leaf node 306A with the key value of 1, for example, backup manager 154 may traverse the first pointer (e.g., the leftmost pointer) of root node 302 to intermediate node 304A since the key value of 1 is less than or equal to the node key of 2 at root node 302. At intermediate node 304A, backup manager 154 may traverse the first pointer (e.g., the leftmost pointer) to leaf node 306A since the key value of 1 is less than or equal to the node key of 1 at intermediate node 304A. By traversing the leftmost pointer at intermediate 304A, backup manager 154 arrives at the desired leaf node 306A with the key value of 1.

To locate leaf node 306B with the key value of 2, for example, backup manager 154 may traverse the first pointer (e.g., the leftmost pointer) of root node 302 to intermediate node 304A since the key value of 2 is less than or equal to the node key of 2 at root node 302. At intermediate node 304A, backup manager 154 may traverse the second pointer (e.g., the rightmost pointer) to leaf node 306B since the key value of 2 is greater than the node key of 1 at intermediate node 304A. To locate leaf node 306C with the key value of 3, for example, backup manager 154 may traverse the second pointer (e.g., the rightmost pointer) of root node 302 to intermediate node 304B since the key value of 3 is greater than the node key of 2 at root node 302. At intermediate node 304B, backup manager 154 may traverse the first pointer to leaf node 306C since the key value of 3 is less than or equal to the node key of 3 at intermediate node 304B.

Each node 302, 304, 306 of tree data 300 may include a checksum 308. Backup manager 154 may incrementally generate checksums for a snapshot by traversing tree data 300 and generating checksums 308 at individual nodes 302, 304, 306 of tree data 300 where checksums (e.g., aggregate checksums) for parent nodes (e.g., nodes with one or more child nodes) are based on checksums of one or more child nodes. Checksums 308 of leaf nodes 306 may be based on data in or associated with leaf nodes 306 (e.g., objects or metadata indicated by leaf nodes 306).

Backup manager 154 may perform a post-order traversal of tree data 300 whereby a checksum 308 is generated for each child node of a parent node prior to the generating a checksum 308 for the parent node. For example, with reference to FIG. 3A, backup manager 154 may generate checksum 308D ("68B5F") and checksum 308E ("70964") using data, such as file system data (e.g., one or more chunks 310 or metadata 314), in or associated with leaf nodes 306A, 306B, respectively. Backup manager 154 may generate checksum 308B ("25E5D") of intermediate node 304A using checksum 308D ("68B5F") of leaf node 306A and checksum 308E ("70964") of leaf node 306B as input.

Continuing this example, backup manager 154 may generate checksum 308F ("1D2F4") of leaf node 306C using data in or associated with leaf node 306C and generate checksum 308C ("487BF") of intermediate node 304B using checksum 308F ("1D2F4") of leaf node 306C as input. Backup manager 154 may generate checksum 308A ("E2DCE") of root node 302 using checksum 308B ("25E5D") of intermediate node 304A and checksum 308C ("487BF") of intermediate node 304B as input. Backup manager 154 may store each checksum 308 in the node 302, 304, 306 at which it was generated, such as at storage system 115.

As described above, tree data 300 may store file system data comprising objects, metadata, or both. FIG. 3A illustrates an example of tree data 300 storing a snapshot of objects in a file system. As can be seen, leaf nodes 306 of tree data 300 may be associated with one or more chunks 310 of data for one or more objects. For example, leaf nodes 306 may include a pointer to one or more chunks 310 of a chunkfile 312. Though not shown, leaf nodes 306 may, in some examples, store one or more chunks 310 at the leaf nodes 306 rather than including a pointer to chunks 310. Chunks 310 and chunkfile 312 of FIG. 3A may be an example of chunks 164 and chunkfiles 162 of FIGS. 1A-2.

FIG. 3B illustrates an example of tree data 300 storing a snapshot of metadata 314 for a file system. As can be seen, tree data 300 may comprise the same tree data structure regardless of whether tree data 300 is storing objects or metadata. As such, backup manager 154 may, for example, traverse tree data 300 of FIG. 3B and generate checksums 308 at nodes 302, 304, 306 such as described above with respect to tree data 300 FIG. 3A. For example, backup manager 154 may perform a post-order traversal of tree data 300 of FIG. 3B and generate checksums 308 during the traversal as described with respect to tree data 300 of FIG. 3A. Likewise, at leaf nodes 306 of FIG. 3B, data associated with leaf nodes 306 may be used as input to generate checksums 308. In the example of FIG. 3B for instance, at leaf node 306A, metadata 314 of leaf node 306A may be used to generate checksum 308D. Though shown as storing metadata 314, in some examples, tree data 300 may store other data in addition to or instead of metadata 314 at one or more leaf nodes 306.

Backup manager 154 may perform a post-order traversal through multiple units of tree data 300. Referring to the example of FIG. 3C, tree data 300A is an example of tree data 300 of FIG. 3B and tree data 300B is an example of tree data 300 of FIG. 3A. Leaf node 306B of tree data 300A includes a reference (e.g., a pointer) to tree data 300B, such as in metadata 314. Thought not shown, reference to tree data 300B may be to a root node of tree data 300B.

In some examples, tree data 300B may be considered a subtree of tree data 300A. As such, backup manager 154 may traverse the combined tree data 300A, 300B and generate and validate checksums 308 as though tree data 300A, 300B are a single unit of tree data. In some examples, backup manager 154 may generate and validate checksums 308 for individual units of tree data 300A, 300B independently. For instance, backup manager 154 may traverse tree data 300B to generate and validate checksums of tree data 300B and separately traverse tree data 300A to generate and validate checksums of tree data 300A. In this case, backup manager 154 may separately indicate whether tree data 300A, tree data 300B, or both are valid or invalid.

Checksums 308 of FIGS. 3A-3C are examples. Though illustrated as hexadecimal strings, checksums 308 may be combinations of various characters or data that differ for different input data even for input data that is only slightly (e.g., <1%) different. As described above, backup manager 154 may implement various processes for generating checksums 308, including secure hash algorithms (e.g., SHA-1, SHA-2), bitwise AND, and combining n significant bits of input data.

As can be seen, checksums 308 of FIG. 3B are distinct relative to FIG. 3A since checksums 308 of FIG. 3B have been generated based on different data (e.g., metadata 314 rather than chunks 310). For example, metadata 314 at leaf nodes 306 of FIG. 3B, results in the checksums 308D ("17AA4"), checksum 308E ("9FB13"), and checksum 308F ("C9B70"). During the post-order traversal checksum generation process, checksums 308D, 308E, 308F propagate upward resulting in checksum 308B ("06937") and checksum 308C ("707BD") at intermediate nodes 304 and checksum 308A ("57487") at root node 302 tree data 300 of FIG. 3B. As a result, the checksums 308 of FIG. 3B are distinct relative to FIG. 3A.

Similarly with respect to FIG. 3C, metadata 314 at leaf node 306B includes a reference to tree data 300B. As such, assuming for this example that tree data 300 of FIG. 3B is otherwise identical, checksum 308E ("3E17B") is distinct (since leaf node 306B includes the reference to tree data 300B) which results in checksum 308B ("5F709") at intermediate node 304A and checksum 308A ("8A25E") at root node 302, as checksum 308E is propagated upward during the post-order traversal checksum generation process.

To validate file system data stored in tree data 300, backup manager 154 may perform a validation traversal (e.g., another post-order traversal) and generate validation checksums as described above with respect to generating checksums 308. As described above with respect to generating checksums 308 for example, backup manager 154 may generate a validation checksum for leaf nodes 306 using data associated with leaf nodes 306 as input and for intermediate nodes 304 and root nodes 302 (e.g., collectively, aggregate checksums) using checksums 308 of their child nodes as input.

Backup manager 154 may compare, at one or more nodes 302, 304, 306, the validation checksum for a node to previously generated checksums 308 for the node. Backup manager 154 may determine tree data 300 is validated if each validation checksum is matches (e.g., is identical to) checksum 308 for the node 302, 304, 306. Alternatively, backup manager 154 may determine tree data 300 is invalid upon determining at least one validation checksum for a node 302, 304, 306 is not identical to the previously stored checksum 308 for the node 302, 304, 306.

In some examples, backup manager 154 may only traverse a subtree of tree data 300 to determine the validity or invalidity of a snapshot. Referring to FIG. 3A for instance, backup manager 154 may traverse a subtree comprising root node 302, intermediate node 304B, and leaf node 306C. Backup manager 154 may perform a post-order traversal of the subtree and, during the traversal, generate a validation checksum at each node 302, 304B, 306C and compare the validation checksum to checksum 308 at each node 302, 304B, 306C. For example, a validation checksum for leaf node 306C may be compared to checksum 308F, a validation checksum for intermediate node 304B may be compared to checksum 308C, and a validation checksum for root node 302 may be compared to checksum 308A.

Upon traversing to root node 302, if each validation checksum has a matching checksum (on a per node basis), backup manager 154 may determine the snapshot in tree data 300 is valid. As can be seen backup manager 154 may not traverse or generate and compare validation checksums for nodes 304A, 306A, 306B which are outside the subtree of nodes 302, 304B, 306C. During a validation traversal, if at least one validation checksum does not match, backup manager 154 may determine the snapshot in tree data 300 is invalid (e.g., contains corrupted data) and output an indication of the same. Backup manager 154 may discontinue traversal once tree data 300 is determined to be invalid.

Figure 4A:
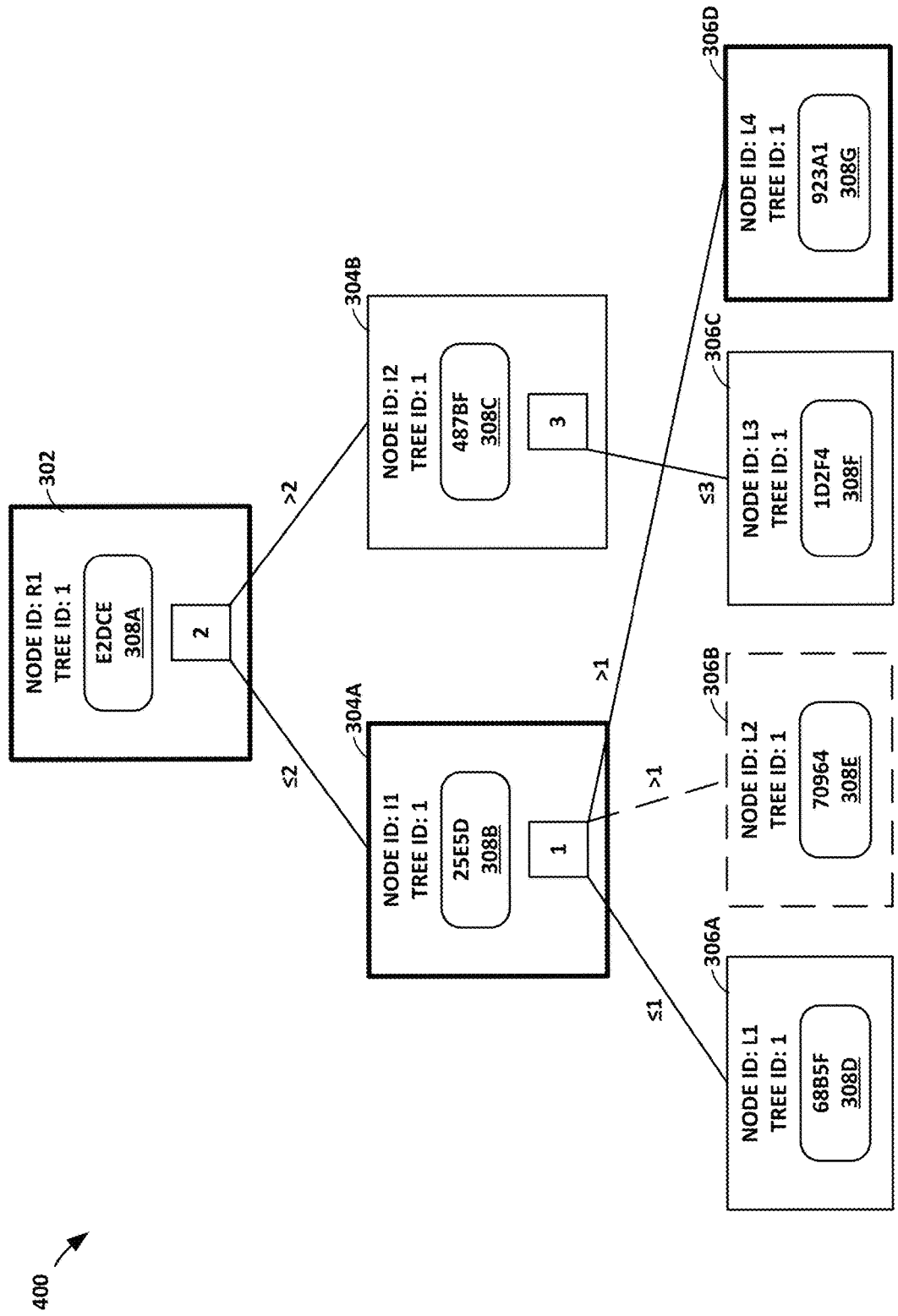
FIGS. 4A-4C are block diagrams illustrating example tree data having respective sets of nodes, in accordance with techniques of this disclosure.
Figure 4B:
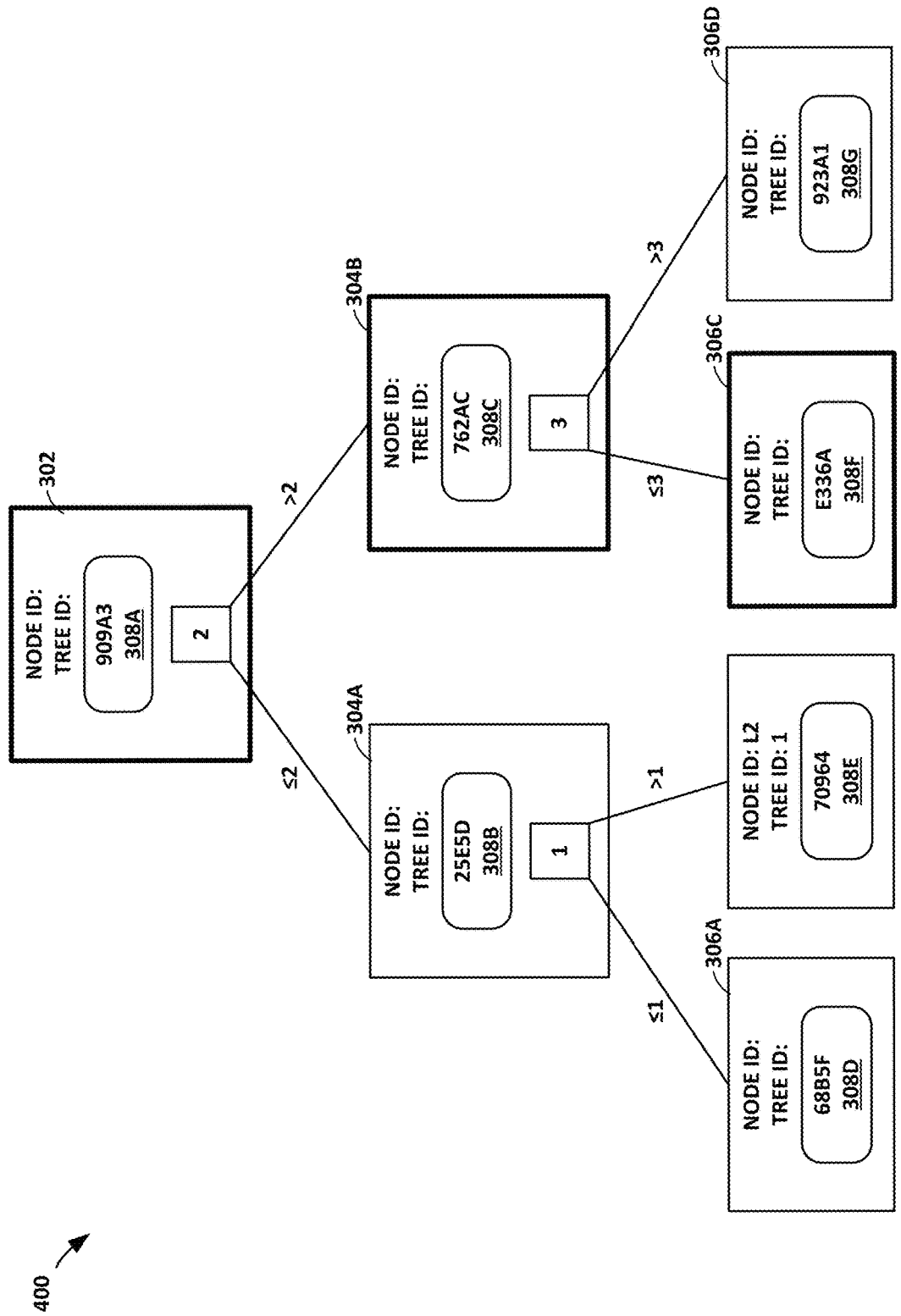
Figure 4C:
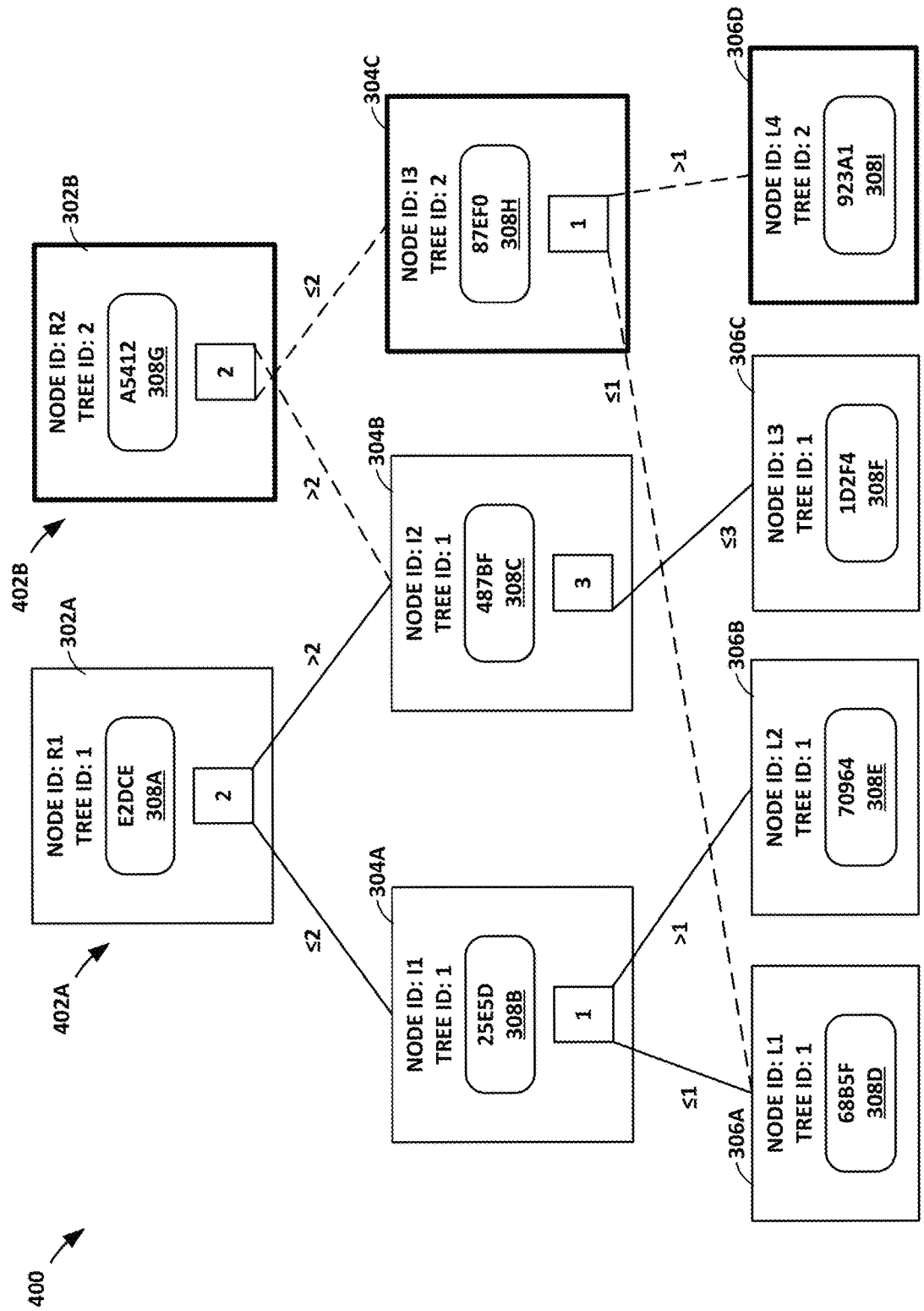

FIGS. 4A-4C are block diagrams illustrating example tree data 400 having respective sets of nodes, in accordance with techniques of this disclosure. Tree data 400 may be an example of tree data 300 of FIGS. 3A-3B. FIGS. 4A-4C illustrate examples of incrementally generating a checksum for a snapshot when file system data is changed. In some examples, backup manager 154 may regenerate checksums 308 for each node that is a parent node of a changed, deleted, or newly added node or of a node with a regenerated checksum. In this manner, checksums 308 can propagate upward in tree data 400 from the changed, deleted, or newly added node through to root node 302. In some examples, backup manager 154 may perform a post-order traversal from a changed node 302, 304, 306 through to a parent or ancestor node, such as root node 302, and generate checksum 308 at each node 302, 304, 306 during the traversal to propagate checksums upward in tree data 400. At the end of such traversal, root node 302 may store checksum 308 resulting from the propagation of checksums of each intermediate node 304 and leaf node 306 of root node 302.

Referring to FIG. 4A for example, leaf node 306D is newly added to replace leaf node 306B. As indicated by the broken line representation thereof, leaf node 306D and the pointer thereto may be removed from tree data 400. Because checksum 308B at intermediate node 304A is based on child node checksums 308D and 308E, the removal of leaf node 306B and addition of leaf node 306D causes checksum 308B to be regenerated using checksums 308D, 308G. Because checksum 308A at root node 302 is based on checksum 308B, checksum 308A is regenerated using regenerated checksum 308B and checksum 308C.

To illustrate, backup manager 154 may generate checksum 308G for leaf node 306D such as with file system data associated with leaf node 306D. Backup manager 154 may clear existing checksums 308 for each parent and ancestor node of leaf node 306D, in this case intermediate node 304A and root node 302. Backup manager 154 may then generate checksums 308 for each such parent and ancestor node. For example, backup manager 154 may generate checksum 308B for intermediate node 304A using checksums 308D, 308G and generate checksum 308A for root node using checksums 308B, 308C. In some examples, backup manager 154 may simply overwrite checksums 308 without clearing checksums 308 first.

As can be seen, the subtree including nodes 302, 304A, 306D associated with the change to tree data 400 (e.g., newly added leaf node 306D and removed leaf node 306B) has updated or regenerated checksums 308A, 308B, 308G. The subtree including nodes 304B, 306A, 306C that are unchanged have unchanged checksums 308C, 308D, 308F. Accordingly, rather than generating a checksum for the entire snapshot represented by tree data 400, or generating checksums for all intermediate nodes regardless of whether or not referenced chunk data or meta data of the sub-tree has been modified with the new snapshot, backup manager 154 may incrementally generate a checksum for the new snapshot by generating checksums 308 for those nodes associated with a changed portion (e.g., subtree) of the snapshot. For example, backup manager 154 may generate checksums 308 for a node associated with a change and each of the nodes parent and ancestor nodes.

FIG. 4B illustrates an example where leaf node 306C is updated. For example, leaf node 306C may include a pointer to a chunk 310 that is modified to point to another chunk 310. Responsive to the change, backup manager 154 may clear checksums 308A, 308C, 308F for the nodes in the subtree of tree data 400 associated with the change (e.g., modification of leaf node 306C). Backup manager 154 may then incrementally generate checksums for the subtree. For example, backup manager 154 may generate checksum 308F for leaf node 306C based on the pointer to chunk 310 or data in the chunk 310. Backup manager 154 may generate checksum 308C using checksums 308F, 308G and generate checksum 308A using checksums 308B, 308C.

FIG. 4C illustrates an example where tree data 400 stores multiple snapshots 402. In the example of FIG. 4C root node 302A represents a first snapshot 402A and root node 302B represents a second snapshot 402B. Snapshot 402A may represent a file system at a first time and snapshot 402B may represent the file system at a subsequent second time. Snapshot 402B may include one or more changes made to the file system since snapshot 402A. In FIG. 4C for example, snapshot 402B includes leaf node 306B rather than leaf node 306D. Leaf node 306D may be associated with new or updated file system data for instance. Backup manager 154 may traverse the subtree starting at root node 302A to retrieve file system data for snapshot 402A and traverse the subtree starting at root node 302B to retrieve file system data for snapshot 402B. As can be seen tree identifiers (e.g., TreeID: 2) of snapshot 402B identify the nodes 302B, 304C, 306D added to create snapshot 402B.

Backup manager 154 may create snapshot 402B by copying or cloning one or more nodes of an existing snapshot, such as snapshot 402A. In some examples, backup manager 154 may clone a subtree of tree data 400, such as the subtree including one or more nodes 302, 304, 306 related to a change. For example, to replace leaf node 306B, backup manager 154 may clone a subtree including the parent and ancestor nodes of leaf node 306B, in this case intermediate node 304A and root node 302A. For instance, backup manager 154 may clone (e.g., copy) root node 302A to generate root node 302B and clone (e.g., copy) intermediate node 304A to generate intermediate node 304C.

A clone of a node may be identical to the node, including the pointers of the node. For example, though not shown, when cloned, root node 302B may include pointers to intermediate nodes 304A, 304B as found in root node 302A. Similarly, when cloned, intermediate node 304C may include pointers to leaf nodes 306A, 306B as found in intermediate node 304A. In some examples, backup manager 154 may omit or clear a checksum 308 of a node 302, 304, 306 when cloning the node. As such checksums 308 for cloned nodes may be empty upon cloning and be subsequently generated by traversing the cloned nodes, as will be described further below.

Backup manager 154 may modify one or cloned nodes when creating snapshot 402B. For example, as shown in FIG. 4C, backup manager 154 may modify intermediate node 304C such that intermediate node 304C has a pointer to leaf node 306D rather than leaf node 306B, as leaf node 306D replaces leaf node 306B in snapshot 402B. Backup manager 154 may modify root node 302B to have a pointer to intermediate node 304C rather than intermediate node 304A.

Snapshot 402B may include pointers to nodes in other snapshots 402A. In this manner, file system data that is common between snapshots 402 can be referenced from other snapshots 402 rather than duplicated. As shown in FIG. 4C for example, snapshots 402A, 402B both include intermediate node 304B and, as such, also include leaf node 306C and the file system data associated therewith. Leaf node 306A is also included in both snapshots 402A, 402B.

Backup manager 154 may incrementally generate checksums 308 for individual snapshots 402 by performing a post-order traversal such as described above. For example, backup manager 154 may perform a post-order traversal of snapshot 402B starting at root node 302B. During the traversal, backup manager 154 may generate checksums 308 for nodes with cleared or empty checksums (e.g., cloned nodes). For example, backup manager 154 may generate checksum 308I using data associated with leaf node 306D. Continuing this example, backup manager 154 may generate checksum 308H using checksums 308D, 308I and checksum 308G using checksums 308C, 308H. At the end of the traversal, root node 302B of snapshot 402B contains the checksum 308G of all the data in or referenced by snapshot 402B. As such, checksum 308G at root node 302B represents a checksum for the entirety of snapshot 402B.

Backup manager 154 may validate individual snapshots 402 through a post-order traversal. For example, to validate snapshot 402A, backup manager 154 may perform a post-order traversal starting at root node 302A and, to validate snapshot 402B, backup manager 154 may perform a post-order traversal starting at root node 302B. Backup manager 154 may generate and compare validation checksums at each node backup manager 154 visits during the traversal and determine the snapshot 402 is valid or invalid based on whether each validation checksum matches is counterpart checksum 308 such as described above.

Figure 5:
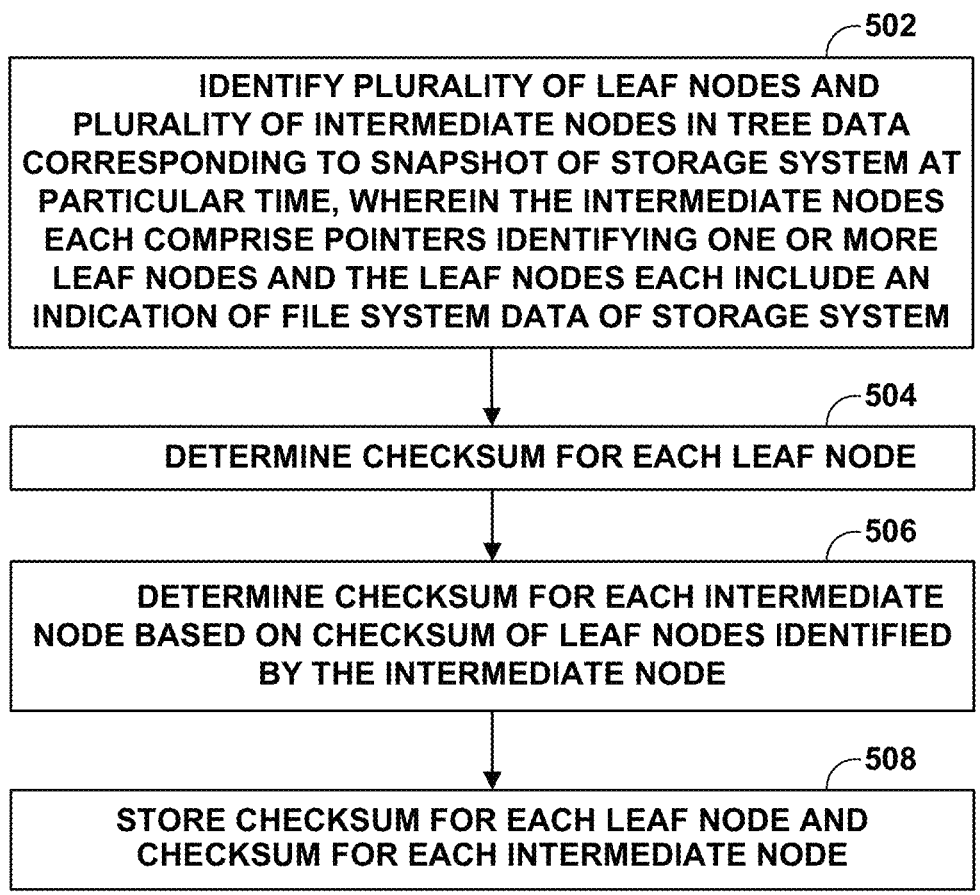
FIG. 5 is a flowchart illustrating example operation of a data platform in performing incremental determination of checksums for a snapshot.

FIG. 5 is a flowchart illustrating example operation of a data platform in performing incremental determination of checksums for a snapshot. FIG. 5 is described below in the context of FIG. 4C. As shown in the example of FIG. 5, backup manager 154 may identify a plurality of leaf nodes 306 and a plurality of intermediate nodes 304 in tree data 400 corresponding to a backup or snapshot 402A of storage system 105 at a particular time (502). For example, tree data 400 may comprise a tree data structure storing a snapshot 402A of file system data of storage system 105 at the particular time. Intermediate nodes 304 may each comprise one or more pointers identifying one or more leaf nodes 306. Leaf nodes 306 may each include an indication of file system data of the storage system. As described above, for example, leaf nodes 306 may include file system data or include a pointer or other reference to file system data stored outside of leaf nodes 306 (e.g., chunks 310).

Backup manager 154 may determine a checksum 308 for each leaf node 306 (504). For example, backup manager 154, such as through checksum module 160, may generate a checksum 308D for leaf node 306A using data associated with leaf node 306A (e.g., file system data or a pointer thereto) as input. Backup manager 154 may generate checksums 308 at each leaf node 306 of snapshot 402A by repeating the checksum generation process described with respect to leaf node 306A.

Backup manager 154 may determine a checksum 308 for each individual intermediate node 304A of the intermediate nodes 304 based on the checksum 308 of leaf nodes 306 identified by the pointers of each individual intermediate node 304A (506). For example, at intermediate node 304A, backup manager 154, such as through checksum module 160, may generate checksum 308B using checksums 308D, 308E of leaf nodes 306A, 306B. Backup manager 154 may generate a checksum 308 at each intermediate node 304 of snapshot 402A by repeating the checksum generation process described with respect to intermediate node 304A.

Determining checksum 308 for each leaf node 306 and determining the checksum 308 for each intermediate node 304 may, in some examples, comprise traversing tree data 400 in a post-order sequence. Checksums 308 for leaf nodes 306 and checksums 308 for intermediate nodes 304 may be determined according to the post-order sequence. For example, backup manager 154 may generate checksums 308D, 308E and generate checksum 308B using checksums 308D, 308E. Continuing this example, backup manager 154 may generate checksum 308F and generate checksum 308C using checksum 308F. Backup manager 154 may subsequently generate checksum 308A with checksums 308B, 308C.

Checksum 308A may be generated for root node 302A in tree data 400. For example, backup manager 154 may identify root node 302A in snapshot 402A of tree data 400. Root node 302 may comprise a plurality of pointers identifying intermediate nodes 304. Backup manager 154 may determine checksum 308A for root node 302 based on checksums 308B, 308C of intermediate nodes 304A, 304B identified by the pointers of root node 302A.

In some examples, checksums 308 may be generated for a portion (e.g., a subset of nodes) of tree data 400 rather than for each node in tree data 400. For instance, backup manager 154 may identify a subset of leaf nodes 306 in tree data 300 associated with a change to the file system data of storage system 105 and a subset of intermediate nodes 304 in tree data 400 having pointers to the subset of leaf nodes 306. In the example of FIG. 4C for instance, backup manager 154 may identify leaf node 306D associated with a change to tree data 400 (e.g., the addition of leaf node 306D) and identify intermediate node 304C which includes a pointer to leaf node 306D. As can be seen the subtree of leaf node 306D, intermediate node 304C, and root node 302B corresponds to the change to tree data 400 (and represents snapshot 402B) of the file system data of storage system 105). Backup manager 154 may regenerate a checksum 308 for each node associated with the change, in this case nodes 302, 304A, 306D.

Cloned nodes may be used to identify a subset of nodes associated with a change to tree data 400 in some examples. For instance, backup manager 154 may identify cloned leaf nodes 306 in tree data 400 associated with a change to the file system data of storage system 105 and identify a subset of intermediate nodes 304 in tree data 400 having pointers to the cloned leaf nodes 306. Referring to FIG. 4C for example, backup manager 154 may identify cloned leaf node 306D and intermediate node 304C having a pointer to cloned leaf node 306D. Backup manager 154 may also identify cloned root node 302B. Backup manager 154 may generate a checksum 308 for each cloned node 302B, 304C, 306D as described above. In some examples, cloned nodes may have empty or cleared checksums 308. As such, backup manager 154 may identify a subset of nodes associated with a change to tree data 400 based on whether a node has an empty or populated checksum 308, with empty checksums indicating a node associated with the change to tree data 400.

Backup manager 154 may store checksum 308 for each leaf node 306 and checksum 308 for each intermediate node 304 (508). For example, relative to snapshot 402A, backup manager 154 may store checksum 308D for leaf node 306A, checksum 308E for leaf node 306B, and checksum 308F for leaf node 306C. Continuing this example, backup manager 154 may store checksum 308B for intermediate node 304A and checksum 308C for checksum 304B. As described above, backup manager 154 may store tree data 400 and checksums 308 on storage system 115.

Snapshot 402A of storage system 105 may by validated by generating a validation checksum at one or more nodes 302, 304, 306 of tree data 400. For example, backup manager 154 may determine a validation checksum for an intermediate node 304A based on the checksum of leaf nodes 306A, 306B identified by pointers from intermediate node 304A. Intermediate node 304A may comprise a plurality of pointers identifying at least two leaf nodes 306 in some examples. In addition to other nodes 302, 304, 306, backup manager 154 may compare the validation checksum for intermediate node 304A to the checksum 308B for intermediate node 304A, such as to determine the validity of snapshot 402A.

An indication of the integrity (e.g., validity or invalidity) of the snapshot may be generated based on the comparisons, on a per node basis, between one or more validation checksums and corresponding checksums 308. For example, a user interface of data platform 150 may output an indication of the integrity of the snapshot that identifies snapshot 402A as valid if validation checksum for intermediate node 304A matches the checksum 308B and as invalid if the validation checksum does not match the checksum 308B.

In some examples, tree data 400 may include a reference to one or more subtrees comprising additional tree data 400. For example, the indication of the file system data in leaf nodes 306 of a first unit of tree data may include an indication of a second unit of tree data comprising leaf nodes 306 including file system data. As described above with respect to FIG. 3C for instance, metadata 314 of leaf node 306B in tree data 300A may include a reference (e.g., pointer) to tree data 300B. In this instance, tree data 300A stores a copy of the metadata of storage system 105 and tree data 300B stores a copy of the objects of storage system 105.

Continuing this example, backup manager 154 may determine a checksum 308 for each leaf node in tree data 300B based on the file system data in one or more leaf nodes tree data 300B. Backup manager 154 may determining checksum 308E for leaf node 306B of tree data 300A by generating a checksum for tree data 300B referenced by leaf node 306B of tree data 300A. A checksum for tree data 300B may be the checksum at a root node of tree data 300B.

Figure 6:
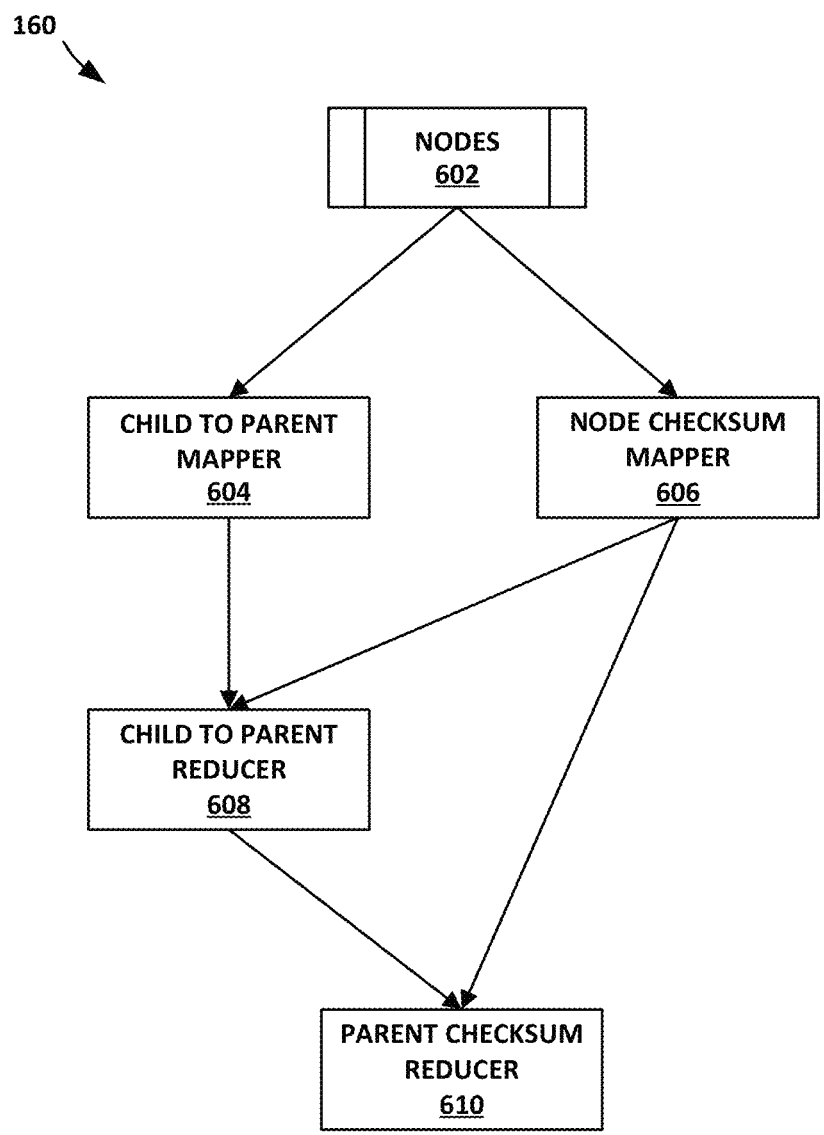
FIG. 6 is a block diagram illustrating example elements for batch validation of checksums.

FIG. 6 is a block diagram illustrating example elements for batch validation of checksums. For example, checksum manager 160 may include one or more mappers 604, 606, one or more reducers 608, 610, or both to perform batch validation of checksums for a snapshot. In the example of FIG. 6 for instance, checksum manager 160 comprises a child to parent mapper 604, node checksum manager 606, child to parent reducer 608, and parent checksum reducer 610. Nodes 602 of FIG. 6 may be an example of nodes (e.g., root, intermediate, and leaf nodes) of tree data 300 as described with respect to FIGS. 3A-3C. Operation of the elements of the example of FIG. 6 are described in the context of the subtree including nodes 304A, 306A, 306B of tree data 300 of FIG. 3A.

One or more mappers 604, 606 may receive nodes 602 as input and generate one or more maps based on nodes 602. For example, node checksum mapper 606 may scan or traverse nodes 602 and output a key-value pair for each node. The key may be a node ID and the value may be the node's checksum 308 and a list of the node's child nodes. For example, node checksum mapper 606 may output the following node checksum map for the subtree including nodes 304A, 306A, 306B of tree data 300 of FIG. 3A.
[
  {I1: (25E5D, [68B5F, 70964])},
  {L1: (68B5F, [ ])},
  {L2: (70964, [ ])}
]

Child to parent mapper 604 may, using the same scan or traversal, generate a map that maps child nodes to parent nodes. For example, child to parent mapper 604 may output a map with a node ID as the key and a parent node ID as the value, such as the following child to parent map.
[
  {L1: I1},
  {L2: I1}
]

One or more reducers 608, 610 may process one or more maps from mappers 604, 606. For example, child to parent reducer 608 may process the output (e.g., maps) from mappers 604, 606 and group values by the respective keys (e.g., by node ID). Child to parent reducer 608 may output one key-value for each parent node where the key is a parent node ID and the value is a child node and checksum. For example, for node 396A (Node ID: L1), child to parent reducer 608 may reduce {L1: (68B5F, [ ])} and {L1: I1} from the above node checksum and child to parent maps to output {I1: (L1, 68B5F)}.

Parent node checksum reducer 610 may group the output from child to parent reducer 608 and node checksum mapper 606 by node ID. At parent node checksum reducer 610, for each key all child node IDs, child node checksums and parent node checksums may be determined via the maps or output of at least node checksum mapper 606, child to parent mapper 604, or both and as may be reduced or grouped, such as by node ID, using child to parent reducer 608.

For example, for node 304A (node ID: I1), parent checksum reducer 610 may reduce the key-value pairs {I1: (L1, 68B5F)}, {I1: (L2, 70964)} from child to parent reducer 608 and {I1: (25E5D, [68B5F, 70964])} from node checksum manager 606. Parent checksum reducer 610 may combine checksums 308 of child nodes to generate a validation checksum. As described above, checksums 308 may be generated in various ways. For example, parent checksum reducer may generate a validation checksum by converting checksums 308 to matrices performing matrix multiplication to the matrices in order (e.g., left to right) to generate a validation checksum.

Checksum manager 160 may compare the validation checksum with checksum 308 of the parent node. If the validation checksum does not match the parent node checksum, the parent node, snapshot, or both can be marked or identified as corrupt. If not mismatching validation checksum is found, the snapshot may be considered valid. For example, parent checksum reducer 610 may combine checksums 308D, 308F (e.g., 68B5F, 70964) of child nodes 308D, 308E (node IDs: L1 and L2) in order and compare the resulting validation checksum with checksum 308B of parent node 304A (node ID: I1). If the validation checksum does not match, parent checksum reducer 610 may identify node 304A as corrupt.

Although the techniques described in this disclosure are primarily described with respect to a backup or snapshot function performed by a backup manager of a data platform, similar techniques may additionally or alternatively be applied for an archive, replica, or clone function performed by the data platform. In such cases, snapshots 142 would be archives, replicas, or clones, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:
    identifying, by a data platform implemented by a computing system, a plurality of leaf nodes and a plurality of intermediate nodes in tree data corresponding to a snapshot of a storage system, wherein:
        the plurality of intermediate nodes each comprise one or more pointers identifying one or more of the plurality of leaf nodes; and
        the plurality of leaf nodes each include an indication of file system data of the storage system;
    determining, by the data platform, a checksum for each of the plurality of leaf nodes;
    determining, by the data platform, a checksum for each intermediate node of the plurality of intermediate nodes based on the respective checksums of the one or more of the plurality of leaf nodes identified by the one or more pointers of the intermediate node; and
    storing, by the data platform, the checksum for each of the plurality of leaf nodes and the checksum for each of the plurality of intermediate nodes.

2. The method of claim 1, further comprising:
    determining, by the data platform, a validation checksum for a first intermediate node of the plurality of intermediate nodes based on the checksum of the one or more of the plurality of leaf nodes identified by the one or more pointers of the first intermediate node;
    comparing the validation checksum for the first intermediate node to the checksum for the first intermediate node stored by the data platform; and
    outputting, by a user interface of the computing system, an indication an integrity of the snapshot based on the comparison.

3. The method of claim 2, wherein the intermediate node comprises a plurality of pointers identifying at least two of the plurality of leaf nodes.

4. The method of claim 1, further comprising:
    identifying, by the data platform, a root node in the tree data, wherein the root node comprises a plurality of pointers identifying the plurality of intermediate nodes; and
    determining, by the data platform, a checksum for the root node based on the checksum of the plurality of intermediate nodes identified by the plurality of pointers of the root node.

5. The method of claim 1, wherein determining the checksum for each of the plurality of leaf nodes and determining the checksum for each of the plurality of intermediate nodes comprises traversing the tree data in a post-order sequence and the checksum for each of the plurality of leaf nodes and the checksum for each of the plurality of intermediate nodes are determined according to the post-order sequence.

6. The method of claim 1, wherein:
identifying the plurality of leaf nodes comprises identifying a subset of leaf nodes in the tree data associated with a change to the file system data of the storage system; and
identifying the plurality of intermediate nodes comprises identifying a subset of intermediate nodes in the tree data comprising the one or more pointers to the subset of leaf nodes in the tree data associated with a change to the file system data of the storage system.

7. The method of claim 1, wherein:
identifying the plurality of leaf nodes comprises identifying a plurality of cloned leaf nodes in the tree data associated with a change to the file system data of the storage system; and
identifying the plurality of intermediate nodes comprises identifying a subset of intermediate nodes in the tree data comprising the one or more pointers to the plurality of cloned leaf nodes in the tree data associated with a change to the file system data of the storage system.

8. The method of claim 1, wherein the tree data is first tree data and the indication of the file system data of the storage system in the plurality of leaf nodes includes an indication of second tree data comprising one or more leaf nodes including the file system data.

9. The method of claim 8, further comprising determining, for each of the plurality of leaf nodes, a checksum for the second tree data based on the file system data in the one or more leaf nodes of the second tree data, wherein determining the checksum for each leaf node of the plurality of leaf nodes in the first tree data includes determining the checksum for the second tree data indicated in the leaf node.

10. A computing system comprising:
a memory storing instructions; and
processing circuitry that executes the instructions to:
identify a plurality of leaf nodes and a plurality of intermediate nodes in tree data corresponding to a snapshot of a storage system, wherein:
the plurality of intermediate nodes each comprise one or more pointers identifying one or more of the plurality of leaf nodes; and
the plurality of leaf nodes each include an indication of file system data of the storage system;
determine a checksum for each of the plurality of leaf nodes;
determine a checksum for each intermediate node of the plurality of intermediate nodes based on the respective checksums of the one or more of the plurality of leaf nodes identified by the one or more pointers of the intermediate node; and
store the checksum for each of the plurality of leaf nodes and the checksum for each of the plurality of intermediate nodes.

11. The computing system of claim 10, wherein the processing circuitry further executes the instructions to:
determine a validation checksum for a first intermediate node of the plurality of intermediate nodes based on the checksum of the one or more of the plurality of leaf nodes identified by the one or more pointers of the first intermediate node;
compare the validation checksum for the first intermediate node to the checksum for the first intermediate node stored by the processing circuitry; and
output, via a user interface of the computing system, an indication an integrity of the snapshot based on the comparison.

12. The computing system of claim 11, wherein the intermediate node comprises a plurality of pointers identifying at least two of the plurality of leaf nodes.

13. The computing system of claim 10, wherein the processing circuitry further executes the instructions to:
identify a root node in the tree data, wherein the root node comprises a plurality of pointers identifying the plurality of intermediate nodes; and
determine a checksum for the root node based on the checksum of the plurality of intermediate nodes identified by the plurality of pointers of the root node.

14. The computing system of claim 10, wherein:
to determine the checksum for each of the plurality of leaf nodes and determine the checksum for each of the plurality of intermediate nodes the processing circuitry further executes the instructions to traverse the tree data in a post-order sequence; and
the checksum for each of the plurality of leaf nodes and the checksum for each of the plurality of intermediate nodes are determined according to the post-order sequence.

15. The computing system of claim 10, wherein:
to identify the plurality of leaf nodes the processing circuitry further executes the instructions to identify a subset of leaf nodes in the tree data associated with a change to the file system data of the storage system; and
to identify the plurality of intermediate nodes the processing circuitry further executes the instructions to identify a subset of intermediate nodes in the tree data comprising the one or more pointers to the subset of leaf nodes in the tree data associated with a change to the file system data of the storage system.

16. The computing system of claim 10, wherein:
to identify the plurality of leaf nodes the processing circuitry further executes the instructions to identify a plurality of cloned leaf nodes in the tree data associated with a change to the file system data of the storage system; and
to identify the plurality of intermediate nodes the processing circuitry further executes the instructions to identify a subset of intermediate nodes in the tree data comprising the one or more pointers to the plurality of cloned leaf nodes in the tree data associated with a change to the file system data of the storage system.

17. The computing system of claim 10, wherein the tree data is first tree data and the indication of the file system data of the storage system in the plurality of leaf nodes includes an indication of second tree data comprising one or more leaf nodes including the file system data.

18. The computing system of claim 17, wherein:
the processing circuitry further executes the instructions to determine for each of the plurality of leaf nodes a checksum for the second tree data based on the file system data in the one or more leaf nodes of the second tree data; and
determining the checksum for each leaf node of the plurality of leaf nodes in the first tree data includes determining the checksum for the second tree data indicated in the leaf node.

19. Non-transitory computer-readable storage media comprising instructions that, when executed, cause processing circuitry of a computing system to:
  identify a plurality of leaf nodes and a plurality of intermediate nodes in tree data corresponding to a snapshot of a storage system, wherein:
    the plurality of intermediate nodes each comprise one or more pointers identifying one or more of the plurality of leaf nodes; and
    the plurality of leaf nodes each include an indication of file system data of the storage system;
  determine a checksum for each of the plurality of leaf nodes;
  determine a checksum for each intermediate node of the plurality of intermediate nodes based on the respective checksums of the one or more of the plurality of leaf nodes identified by the one or more pointers of the intermediate node; and
  store the checksum for each of the plurality of leaf nodes and the checksum for each of the plurality of intermediate nodes.

20. The non-transitory computer-readable storage media of claim 19, wherein, when further executed, the instructions cause the processing circuitry of the computing system to:
  determine a validation checksum for a first intermediate node of the plurality of intermediate nodes based on the checksum of the one or more of the plurality of leaf nodes identified by the one or more pointers of the first intermediate node;
  compare the validation checksum for the first intermediate node to the checksum for the first intermediate node stored by the processing circuitry; and
  output, via a user interface of the computing system, an indication an integrity of the snapshot based on the comparison.

* * * * *